Figure 1:
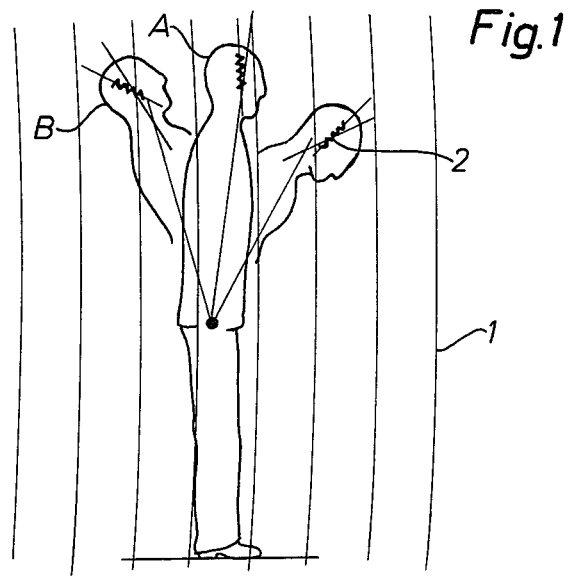

United States Patent [19]

Palmaer

[11] 4,041,497
[45] Aug. 9, 1977

[54] HEADBAND WITH RECEIVER AND DIRECTIONAL ANTENNA

[76] Inventor: Tore Georg Palmaer, Smultronvagen 28, S-331 00 Varnamo, Sweden

[21] Appl. No.: 574,701

[22] Filed: May 5, 1975

[51] Int. Cl.² .............................................. H01Q 1/24
[52] U.S. Cl. .................................. 343/702; 343/718; 325/354
[58] Field of Search ............... 343/702, 718; 325/365, 325/376, 354

[56] References Cited

U.S. PATENT DOCUMENTS

| 1,486,049 | 3/1924 | Spring | 343/718 |
| 2,678,999 | 5/1954 | Norris | 343/718 |
| 3,199,108 | 8/1965 | Munk | 343/895 |
| 3,266,042 | 8/1966 | Mahoney et al. | 343/718 |

OTHER PUBLICATIONS

Popular Mechanics, Apr. 1950, pp. 133, 134.

*Primary Examiner*—Eli Lieberman

[57] ABSTRACT

The present invention relates generally to a receiver antenna construction for a mobil communication unit adapted to be worn by the operator on the head. The antenna of the receiver is initially orientated in an inclined position in relation to the geometrical vertical line of the head in order to be able to receive the optimal value of the field strength deriving normal work positions of the head of the operator.

1 Claim, 2 Drawing Figures

U.S. Patent      Aug. 9, 1977      4,041,497

HEADBAND WITH RECEIVER AND DIRECTIONAL ANTENNA

BACKGROUND OF THE INVENTION

The present invention relates to an antenna construction for a receiver for electromagnetic waves in a mobil communication unit adapted to be worn on the operators head, such as ear-phones, ear-muffs, helmets, spectacles etc.

When receiving directed, polarized, electromagnetic waves it is important that the receiver antenna is correctly orientated in the field which, for technical reasons, is usually entirely horizontal or vertical. Permanent receiver antennae are given the same direction as transmitting antennae in order to be able to receive the maximum value of the field strength.

If the direction of the receiver antenna deviates from that of the transmitting antenna, the voltage of the antenna drops from maximum to 0 with the cosine value of the angle. In practice a signal deviation of 3 decibels is minimal and a deviation of 10 decibels can easily be compensated by compression amplifiers. This means that a directional deviation of ± 30% will not be noticeable and a deviation of ± 60 will not disturb the receiver. However, with higher values the voltage drops rapidly to 0 and receiving becomes impossible.

Previously the inconvenience of a movable antenna with substantially portable receivers was not considered important since the apparatus were relatively large and did not invite wide angular movement. Nowadays receivers are small, often have built-in antennae and are often directly attached for example in hearing sets and the like arranged on the listener's head.

The angular movement of the head is considerable in relation to that of the body, for example, and may often be 120°, 90° forwards and 30° backwards during work (when looking at the floor or up at the ceiling). During normal work, for example at a machine or writing desk, the head is inclined about 20° forward.

One object of the present invention is therefore to eliminate the above mentioned drawbacks and, in normal working positions, to avoid any fading of the receiver.

A further object of the invention is to provide a communication unit having a receiver with a new and improved antenna construction giving optimal receiving conditions for the longest possible time.

These objects, others and numerous advantages will be set forth and apparent from the following description of the invention.

SUMMARY OF THE INVENTION

According to the present invention the antenna of said receiver is directed in a backwardly inclined position in relation to the geometrical vertical line of the head.

Preferably the angle between the antenna and said geometrical vertical line of the head is between 15° and 45°.

Furthermore said antenna may be enclosed in said receiver.

Figure 2:
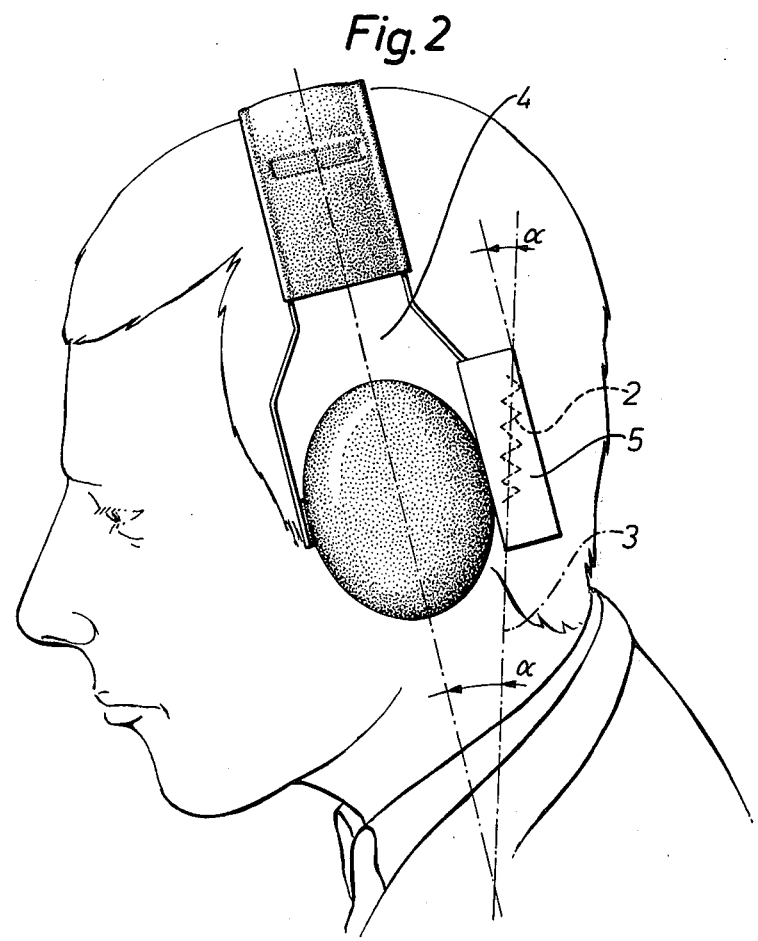

Full details of the present invention follows herein and will be seen in connection with the accompanying drawings, where FIG. 1 shows schematically a person in various working positions with a loop receiver placed on an ear-muff and FIG. 2 shows a close-up of the same person and loop receiver in normal working position.

The electromagnetic field is generated by music and voices from a teleoop and forms vertical power lines 1 which pass through the antenna coil 2 where the electrical current is generated which is amplified and supplied to the ear-phones where it is reconverted to music and speech. Depending on the position of the person (direction of the head) various voltages are generated in the same field in the antenna coil 2. The most usual working positions A-B will be maximal to 3 decibels and somewhat lower in positions C and D.

If the coil had been directed in the geometrical vertical line 3 of the head, the voltage would have dropped to 0 in position C and its vicinity.

FIG. 2 shows a person wearing ear-muffs 4 with ear-phones supplied from a loop receiver 5 with antenna coil 2 mounted in a head yoke. As can be seen, the apparatus is well situated on the ear-muff arrangement (and thus also on the head) at the same time as the antenna coil 2 is correctly orientated due to its inclination in the angle α. This inclination of the antenna can of course be achieved with the receiver situated at other points or if the cover of the ear-muff also forms the casing of the receiver.

Thus it is apparent that while the present invention has been shown in only one embodiment, numerous changes and modifications can still be made. The present disclose should, therefore, be taken as illustrative only and not limiting the invention.

What is claimed:

1. In combination with a portable radio receiver, a housing for enclosing said receiver, a headband for supporting said housing along one side of the head of a user, said headband and housing defining a plane of symmetry coincident with the lateral plane of symmetry of the head of the user an antenna integrally mounted in said housing with said receiver, said antenna comprising a coil having a longitudinal axis, said coil being fixedly mounted with respect to said receiver at a rearwardly inclined angle of between 15° - 45° with respect to the plane of symmetry of the headband and receiver when worn in the normally geometric vertical position on the head.

* * * * *